United States Patent [19]

Brauer et al.

[11] Patent Number: 5,513,439
[45] Date of Patent: May 7, 1996

[54] WHEEL ALIGNMENT AND DIAGNOSTIC APPARATUS UTILIZING RIDE HEIGHT

[75] Inventors: Stephen F. Brauer, Ladue; Nicholas J. Colarelli, III, Creve Coeur, both of Mo.

[73] Assignee: Hunter Engineering Company, Bridgeton, Mo.

[21] Appl. No.: 101,580

[22] Filed: Aug. 3, 1993

[51] Int. Cl.$^6$ ..................................... G01B 7/30
[52] U.S. Cl. ..................... 33/203.18; 33/203; 364/560
[58] Field of Search ................. 33/203, 203.18, 33/203.19, 203.2, 288, 600; 364/560, 561, 562, 424.03

[56] References Cited

U.S. PATENT DOCUMENTS

| | | | |
|---|---|---|---|
| 3,892,042 | 7/1975 | Senften | 33/301 |
| 4,336,658 | 6/1982 | January et al. | 33/203.18 |
| 4,879,670 | 11/1989 | Colarelli | 364/559 |
| 4,918,821 | 4/1990 | Bjork | 33/203.18 |
| 4,977,524 | 12/1990 | Strege et al. | 364/562 |
| 5,033,198 | 7/1991 | Hastings | 33/203.18 |
| 5,369,602 | 11/1994 | Naas et al. | 33/203.18 |

FOREIGN PATENT DOCUMENTS

| | | | |
|---|---|---|---|
| 2934411 | 3/1981 | Germany | 33/203.18 |
| 2025064 | 1/1980 | United Kingdom | 33/203.18 |

OTHER PUBLICATIONS

D. January, "Derivation of Toe Alignment Equations," 1987.

*Primary Examiner*—William A. Cuchlinski, Jr.
*Assistant Examiner*—G. Bradley Bennett
*Attorney, Agent, or Firm*—Polster, Lieder, Woodruff & Lucchesi

[57] ABSTRACT

Vehicle wheel alignment apparatus includes a storage device for storing vehicle wheel alignment angle specifications, wheel alignment sensors, and ride height sensors. A controller is responsive to the acquired wheel alignment angle data and to the measured ride height for determining whether, taking into consideration the vehicle ride height, a measured wheel alignment angle falls within specifications. Apparatus for diagnosing vehicle wheel alignment and suspension problems also includes a jack for vertically moving the body of the vehicle with respect to the wheels to temporarily change the ride height of the vehicle. The controller is responsive to changes in measured wheel alignment angles with changes in measured ride height to diagnose vehicle alignment and suspension problems.

16 Claims, 9 Drawing Sheets

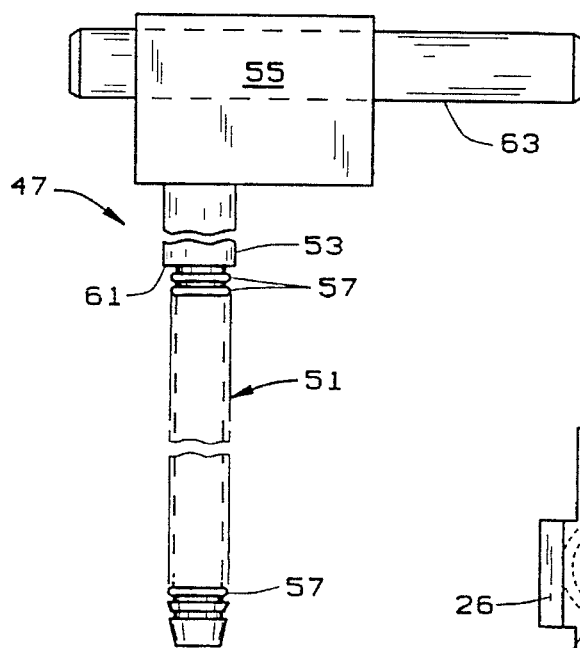
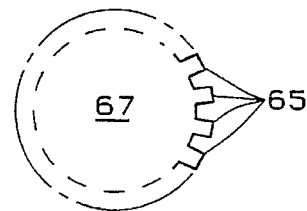
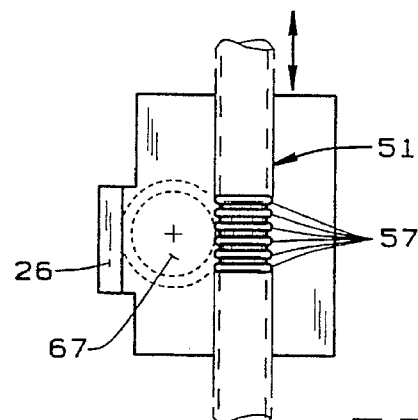
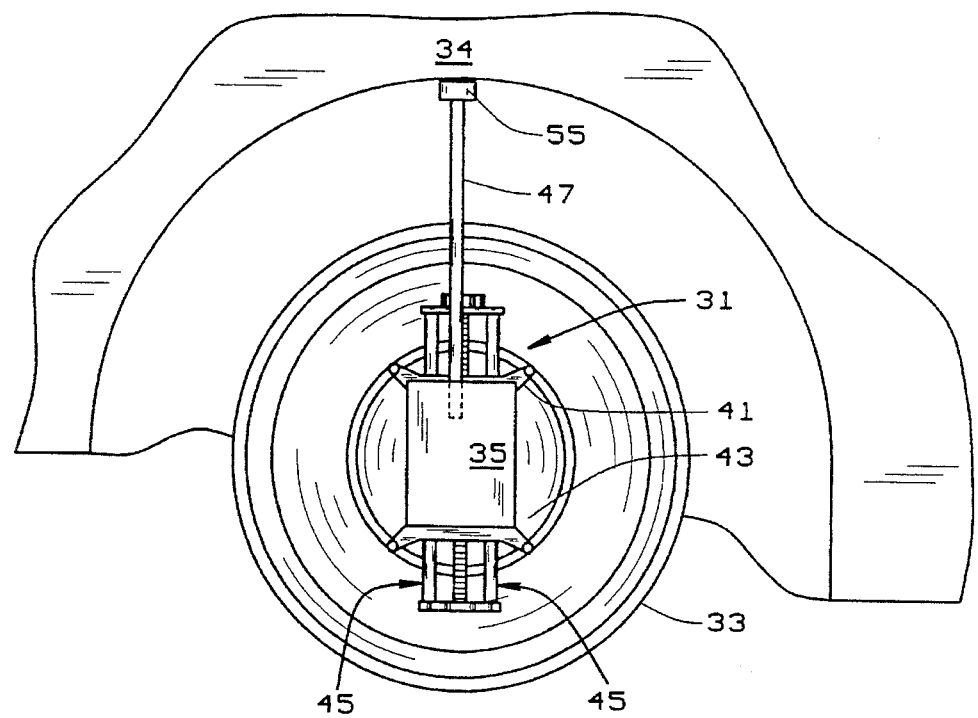
FIG. 5
FIG. 6
FIG. 7
FIG. 8

WHEEL ALIGNMENT AND DIAGNOSTIC APPARATUS UTILIZING RIDE HEIGHT

BACKGROUND OF THE INVENTION

This invention relates to vehicle service apparatus and more particularly to wheel alignment and diagnostic apparatus utilizing ride height measurements.

The ride height of a vehicle may be defined in various ways. Some manufacturers specify ride height as the distance from the ground to the vehicle bumper, while others may use the distance between the center of a wheel (or some other reference point) and the vehicle body wheel arch for that wheel. No matter how defined, the ride height typically changes over time. These changes can result from wear of or damage to the suspension components or incorrect adjustment, and can be evidence of serious alignment problems. Or they may merely reflect the action of adjustable suspensions or variations in load. Some manufacturers provide specifications for ride height which, if ignored, can result in failure to adequately diagnose and repair misalignment of the vehicle. Moreover, changes in measured alignment angles with ride height may evidence serious problems such as bump steer, improper cradle adjustment, or extremely worn or loose parts.

U.S. Pat. No. 4,977,524 to Strege et al. (co-assigned with the present application) discloses an electronic measuring gauge for measuring ride height which supplies the measured ride height to a vehicle inspection/alignment system. That electronic measuring gauge was hand held by the technician/user and was connected by a separate cable to the inspection/alignment system console. The console included a computer with a memory which compared the measured ride height from the hand held measuring gauge with stored specifications for ride height.

For some time, it has been known that caster measurements for light trucks are affected by ride height, specifically by the frame angle calculated from front and rear ride height measurements. Printed charts have been provided for use by the technician to manually compensate for ride height in that particular situation.

SUMMARY OF THE INVENTION

Among the various objects and features of the present invention may be noted the provision of an improved wheel alignment apparatus which automatically takes into account ride height measurements.

Another object is the provision of such an improved apparatus which involves a minimum of additional effort on the part of the technician/user.

A third object is the provision of such an improved apparatus which substantially eliminates human error in its use.

A fourth object is the provision of diagnostic apparatus which utilizes ride height measurements in diagnosing alignment and suspension problems.

A fifth object is the provision of such an improved apparatus which automatically takes into account variations in measured wheel alignment angles with ride height.

A sixth object is the provision of such an improved apparatus which provides improved diagnosis of alignment and suspension problems.

Other objects and features may be in part apparent and in part pointed out hereinafter.

Briefly, vehicle wheel alignment apparatus of the present invention includes a storage device for storing vehicle wheel alignment angle specifications, at least one wheel alignment sensor for acquiring wheel alignment angle data of at least one wheel mounted on a vehicle, and at least one ride height sensor for measuring the ride height of the vehicle whose alignment is to be measured. A controller is responsive to the acquired wheel alignment angle data and to the measured ride height for determining whether, taking into consideration the vehicle ride height, a measured wheel alignment angle falls within specifications.

A method of checking vehicle wheel alignment of the present invention includes electronically storing vehicle wheel alignment angle specifications, electronically acquiring wheel alignment angle data of at least one wheel mounted on a vehicle, electronically measuring the ride height of the vehicle whose alignment is to be measured, and determining whether, as a function of the vehicle ride height, a measured wheel alignment angle falls within specifications.

Apparatus of the present invention for diagnosing vehicle wheel alignment and suspension problems includes wheel alignment sensors for acquiring wheel alignment angle data for a plurality of wheels mounted on a vehicle, ride height sensors for measuring the ride height of the vehicle, and a jack for vertically moving the body of the vehicle with respect to the wheels to temporarily change the ride height of the vehicle. A computer is operatively connected to the wheel alignment sensors and the ride height sensors and is responsive to changes in measured wheel alignment angles with changes in measured ride height to diagnose vehicle alignment and suspension problems.

A method of the present invention for diagnosing vehicle wheel alignment and suspension problems includes the steps of electronically acquiring wheel alignment angle data for a plurality of wheels mounted on a vehicle, electronically measuring the ride height of the vehicle, vertically moving the body of the vehicle with respect to the wheels to temporarily change the ride height of the vehicle, and diagnosing vehicle alignment and suspension problems by examining changes in measured wheel alignment angles with changes in measured ride height.

BRIEF DESCRIPTION OF THE DRAWINGS

FIG. 5 is a side view of a ride height measuring arm used in the present invention;

FIG. 6 is a top view of a pinion used with the ride height measuring arm of FIG. 5;

FIG. 7 is an elevation illustrating the operation of the ride height measuring arm of FIG. 5 and the pinion of FIG. 6;

FIG. 8 is a view similar to FIG. 4 showing the ride height measuring arm of FIG. 5 extended to its measuring position;

Similar reference characters indicate similar parts throughout the several views of the drawings.

DESCRIPTION OF THE PREFERRED EMBODIMENT

Figure 1:
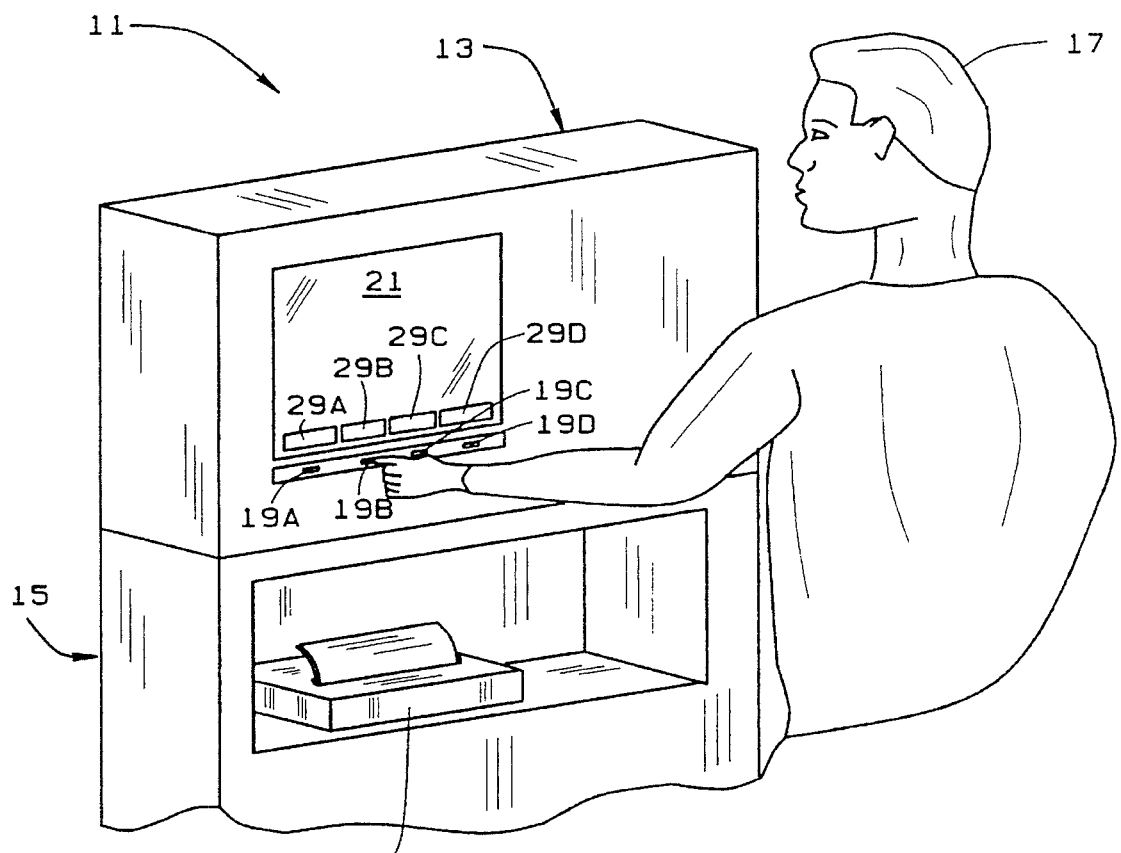
FIG. 1 is a perspective view of a vehicle alignment/diagnostic system console (with a technician/user) usable with the present invention.
Figure 2:
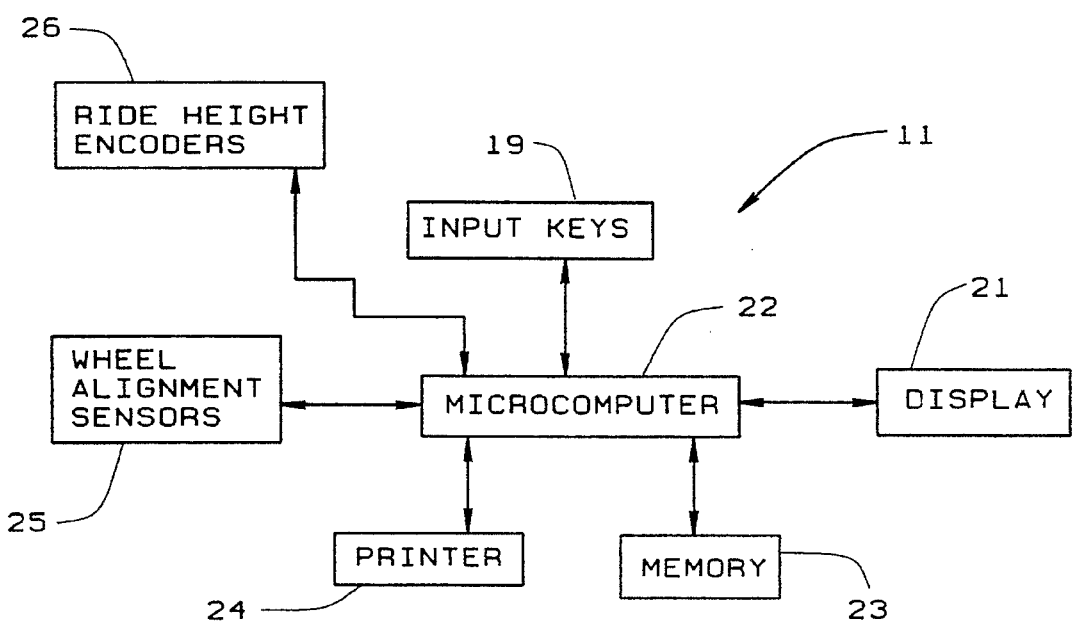
FIG. 2 is a block-diagram of the circuitry of the system of FIG. 1.

Turning to the drawings, and more particularly to FIGS. 1 and 2, there is shown a vehicle wheel alignment/diagnostic system 11 utilizing a ride height measuring apparatus described below. Of course, the particular ride height measuring apparatus is illustrative only. The present invention is not limited to any particular ride height measuring apparatus.

Alignment/diagnostic system 11 includes a console 13 suitably mounted on a stand 15 for use by a technician/user 17. Console 13 includes a set of manually operable input keys or switches 19(A–D) and a display 21.

Input keys 19 and display 21 are connected to a microcomputer 22 which functions as an electronic controller to control the operation of system 11. Any number of different microcomputers may be used in system 11, depending upon the other requirements of the system. Microcomputer 22 is shown in FIG. 2 connected to a digital memory 23, and a printer 24. It should be understood that memory 23 could be internal to microcomputer 22, depending upon the particular microcomputer used. In addition, other peripheral devices (not shown) could be connected to microcomputer 22 as desired.

A plurality of wheel alignment sensors 25 are operatively connected to microcomputer 22 for supplying alignment information to the microcomputer. The use of such sensors to measure alignment characteristics is, of course, well known. See, U.S. Pat. No. Re 33,144 to Hunter et al., U.S. Pat. No. 4,319,838 to Grossman et al., U.S. Pat. No. 4,381,548 to Grossman et al., and U.S. Pat. No. 4,879,670 to Colarelli, the disclosures of which are incorporated herein by reference.

Microcomputer 22 is also connected to a plurality of ride height encoders 26 (discussed below), which system 11 uses to determine the ride height of the vehicle under test. More particularly, there is preferably one ride height encoder per wheel, although the present invention could be implemented using a single encoder which is moved from wheel to wheel, or any variation thereof.

The bottom of display 21 contains four variable function blocks 29A–D (the display of which is controlled by microcomputer 22). Function blocks 29A,D are disposed directly over corresponding switches 19A–D and display to the user the function of those switches at that particular time in the program which controls the operation of microcomputer 22.

Figure 3:
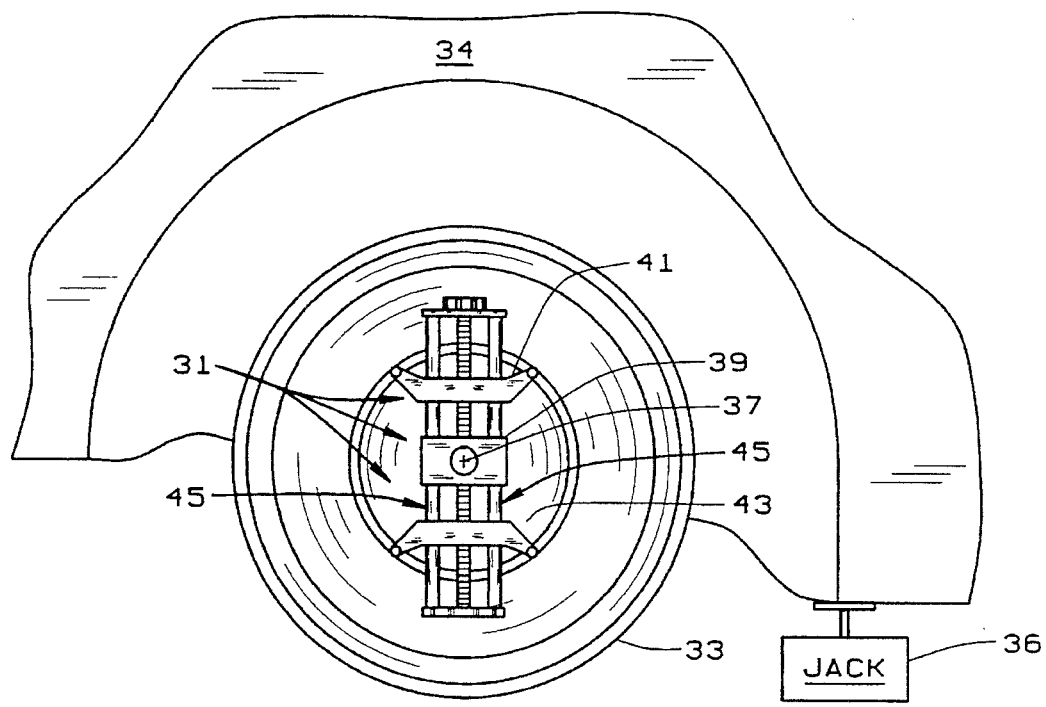
FIG. 3 is a front elevation of an adapter used in the present invention mounted on a wheel/tire assembly of a vehicle whose ride height is to be measured.

Turning to FIGS. 3–8, the ride height determining apparatus includes an adapter 31 removably mountable on a wheel/tire assembly 33 of a vehicle 34 (only a portion of which is shown in the FIGS.), the wheel/tire assembly being mounted on the vehicle. Such adapters are known in the art, and are conventionally used to mount a sensor housing 35 (FIG. 4) containing wheel alignment sensors 25 in a fixed geometrical relationship with the axis 37 (FIG. 3) of the wheel. Also shown in FIG. 3 is a jack 36 used as part of system 11 to elevate the body of the vehicle with respect to the wheel/tire assembly. Since many different kinds of jacks are conventionally used with alignment and diagnostic equipment, the jack is shown in simplified form.

Adapter 31 is designed to fit numerous sizes of wheels, but is constructed so that its center mounting plate 39 remains centered over wheel axis 37. This is accomplished by moving upper and lower arms 41, 43 along parallel tracks 45 equal distances until the arms are stopped by contact with the wheel. As a result there is always a fixed geometrical relationship between the mounting plate of adapter 31 and the wheel axis.

Adapter 31 has conventionally mounted thereto sensor housing 35 which differs from a conventional wheel alignment sensor housing in that it has a path therein for linear movement of an arm 47. Arm 47 is completely removable from sensor housing 35 (or any equivalent separate housing providing a guide path for the arm) so that the arm may be taken out of the way except for those times when a ride height measurement is being made.

Arm 47 is roughly one and one-half feet in length and includes (see FIG. 5) a lower shaft portion 51 terminating in an upper shaft portion 53, which in turn terminates in a block 55. The two shaft portions are made of glass filled nylon rod (or any other suitable material). The lower shaft portion is machined or molded to have a series of longitudinally disposed rings 57 disposed substantially along the entire length of the lower shaft portion. As a result, the lower shaft portion functions as a rack in a rack and pinion system described below.

Upper shaft portion 53 is of slightly larger diameter than the lower shaft portion so as to provide a shoulder 61 between the two portions. This shoulder provides a natural stop for arm 47, as described below. Of course the bottom portion of lower shaft portion 51 could also serve the function of a stop. Upper shaft portion 53 terminates at its upper end in block 55. The block further serves to mount a finger 63 in fixed geometrical relationship with the shaft.

The rings 57 on lower shaft portion 51 are evenly spaced to engage the teeth 65 in a pinion 67 (FIGS. 6 and 7) so that linear motion of lower shaft portion 51 along the path in the housing results in corresponding rotation of the pinion. Pinion 67 (see. FIG. 7) is operatively connected to encoder 26, so that the output of the encoder is an electrical signal indicative of the movement of lower shaft portion 51 with respect to the housing. It should be noted that since encoder 26 is disposed adjacent the wheel alignment sensors, the same electrical cabling (or other communications channel) may be used to send the signal from the encoder back to the microcomputer that is used to carry the wheel alignment sensor signals.

Figure 4:
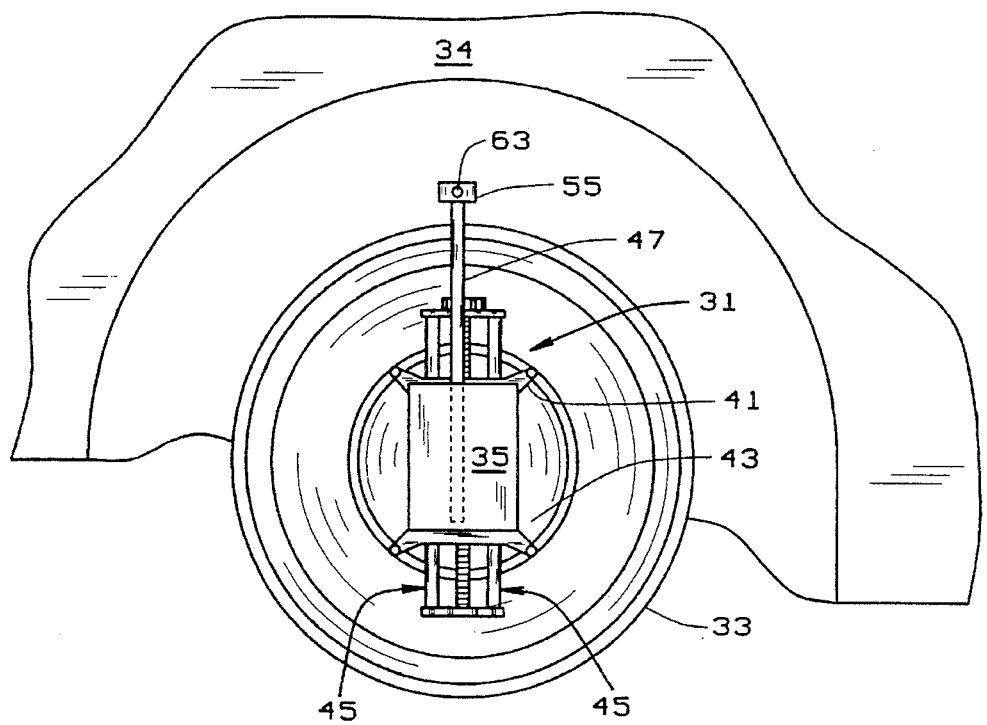
FIG. 4 is a view similar to FIG. 3 showing the ride height measuring apparatus used in the present invention mounted to the adapter of FIG. 3.

In operation, the technician 17 manually takes arm 47 and places it in the path or track in housing 35 and lets the arm move downwardly to its rest position (shown in FIG. 4). The microcomputer observes the output of the ride height encoder 26 during this time. When the output of the encoder remains the same for longer than a preset interval, the microcomputer assumes that the arm has moved to its rest position. Although the preset interval is of no real significance, it should be relatively short since the technician upon moving the arm to its rest position will generally rather quickly start moving the arm upwardly to take the ride height measurement. The arm is rotated so that the finger 63 faces toward the vehicle (as shown in FIG. 8) or to some other desired measuring position. This is to ensure that as the arm is moved vertically upwardly with respect to the sensor housing, finger 63 will engage the wheel arch of vehicle 34 and halt further upward movement of the arm.

Microcomputer 22 keeps track of the output from encoder 26 as the arm is moved vertically upwardly along the path from its rest position to the extended position (shown in FIG. 8) in which the finger engages the wheel arch. Once the pulses from the encoder stop (i.e., no further pulses are received over a predetermined time interval), microcomputer 22 concludes that the finger has engaged the wheel arch. The number of pulses from the encoder during this movement is directly proportional to the distance traveled by the arm. The microcomputer therefore converts the encoder pulses to a distance of arm travel. Since the arm in its rest position is in fixed geometrical relationship with the wheel axis independent of the type or size of wheel, the distance of arm travel determined by the microcomputer differs from the ride height only by a constant. The constant is, of course, the fixed distance between the wheel axis and the top of finger 63 when the arm is in its rest position. Microcomputer 22, therefore, adds the fixed distance to the measured distance of travel of the arm to obtain the ride height.

Once the microcomputer determines the ride height, it is displayed on display 21 or printed in a report on printer 24 (if desired). Of course, wheel alignment data can be displayed or reported at the same time. It is also preferred that memory 23 have stored therein ride height specifications for various vehicles, so that these specifications may be compared by microcomputer 22 with the measured ride height value. If those ride height specifications as supplied from the manufacturer are for a distance other than wheel-arch-to-wheel-axle, those specifications are converted to corresponding wheel-arch-to-wheel-axle specifications before storage in memory 23.

Once the ride height measurement is taken, the arm may be moved back down to its rest position (FIG. 4). If necessary, the arm may be rotated to prevent interference between finger 63 and the vehicle body before the measuring arm is moved vertically upwardly until it is completely removed from the sensor housing. This prevents ride height arm 47 from interfering with any subsequent use of the wheel alignment sensors. Alternatively, finger 63 may be loosely mounted in block 55 so that it may be moved outwardly and inwardly as needed to make or not make contact with the vehicle body as desired.

Figure 9:
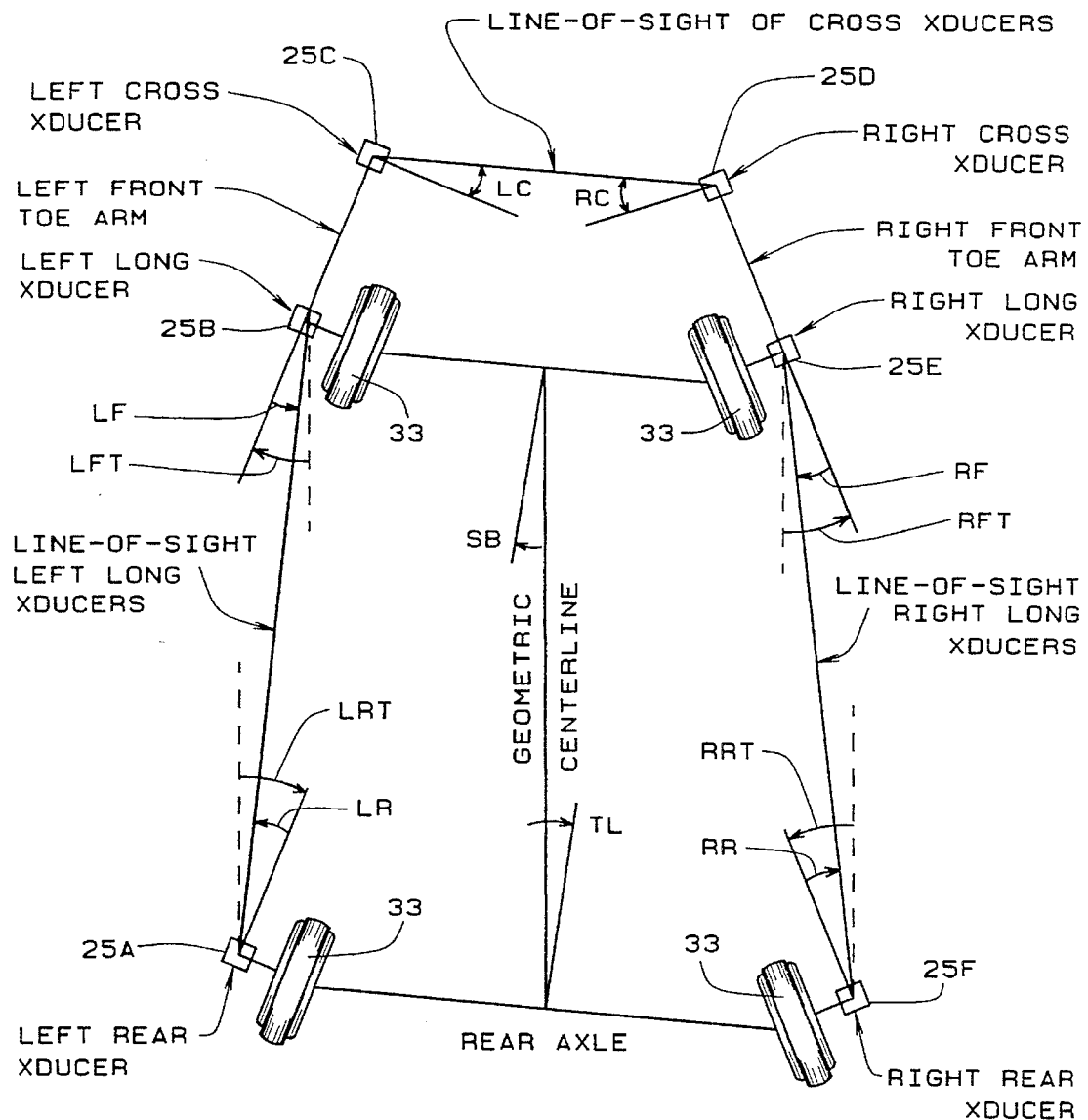
FIG. 9 is a graphical representation of a four-wheeled vehicle illustrating the placement of the wheel alignment sensors.

It should be understood that a vehicle alignment/diagnostic system 11 preferably includes six angle sensors 25A–25F as indicated in FIG. 9 for measuring the various alignment angles of the vehicle. Such measurements and angles are explained in detail in co-assigned U.S. Pat. No. 4,319,838 to Grossman et al. incorporated herein by reference. In particular, the system preferably includes a pair of toe sensors 25C and 25D, associated with the front wheels of the vehicle, along with four additional sensors associated with each wheel. In addition, the present system includes ride height sensor encoders 26 associated with each wheel as explained above.

In use, system 11 has vehicle wheel alignment angle specifications prestored in memory 23. The wheel alignment sensors 25 are used to acquire wheel alignment angle data from the wheels, and the ride height sensors are used to measure ride height at one or more of the wheels. Microcomputer 22 is responsive to the acquired wheel alignment angle data and to the measured ride height for determining whether, taking into consideration the vehicle ride height, a measured wheel alignment angle falls within specifications.

Vehicle ride height can be taken into consideration in various ways. In one embodiment, the memory 23 has nominal specifications stored therein, and the microcomputer 23 adjusts those specifications in response to the amount of measured ride height. In another embodiment, the memory has separate specifications for different values of ride height and the microcomputer is responsive to the measured ride height to access the specifications corresponding to that ride height value.

It should be appreciated that the adjustment for ride height may involve a ride height measurement at a single wheel, or at multiple wheels. Angles depending upon the orientation of a single wheel may be adjusted for ride height using the ride height measurement for that wheel alone. One example of this is camber. The camber determined for each wheel is adjusted for the actual ride height measured for that particular wheel by the corresponding ride height sensor.

On the other hand, where the alignment angle involves two wheels (for example, total toe involves both wheels on an axle), ride height measurements are taken for both wheels of that axle, and the ride height for that axle is determined. In its simplest form, the average of the two wheel ride height measurements is used as the ride height for the axle.

Similarly, ride height measured with respect to the front and the rear wheels provides, given the wheelbase of the vehicle, an indirect measurement of the front to back frame angle for the vehicle. This frame angle is used to compensate the caster angle for each side. As is well known, a pair of sensors 25 are used to determine caster. The measured frame angle may be obtained separately for each side of the vehicle, it may be measured for one side and that angle used for both, or an average frame angle may be computed based upon ride height measurements at all four wheels.

The diagnostic functions of system 11 utilize the measurements of wheel angle and ride height discussed above. System 11 uses display 21 to guide technician 17 through the process of diagnosing vehicle symptoms. Specifically, the microcomputer works interactively with the technician to guide the diagnostic procedure and perform the diagnosis. This is done by means of display 21, which the microcomputer uses to present diagnostic questions and the identification of diagnostic procedures to the technician, and by means of input keys 19, which the technician uses to initially identify the symptom for the microcomputer, and to provide answers to the diagnostic questions.

The diagnostic system of the present invention is capable of diagnosing vehicle problems based on information that it receives from the technician 17, the sensors 25, and the customer and specifications databases. Database information is prestored in memory 23 for various makes and models of vehicles.

The diagnostic system is an expert system that uses a knowledge base of information regarding vehicle alignment and suspensions. A knowledge base is a set of rules and facts that, when used together, can diagnose problems. Rules are if-then constructs that hold knowledge such as "If there is feather edge tire wear, then there may be an excessive toe angle". The particular knowledge base of information is a matter of individual choice and forms no part of the present invention. Any such knowledge base is equally usable with the present invention.

In overview, the diagnostic system interactively diagnoses problems by prompting the technician 17 through a series of questions displayed on CRT display 21. The system begins by asking the technician for a major symptom and then proceeds to narrow down the cause of the problem by asking a series of questions. Microcomputer 22 asks a minimum number of relevant questions. Before asking each question, microcomputer 22 considers the answers to all the preceding questions in order to determine the best question to ask next. The system, if desired, may also ask the technician to perform simple diagnostic procedures such as rotating tires in order to locate the cause of the problem. The diagnostic questions and the identification of diagnostic procedures are stored in memory 23 for use as needed in diagnosing a selected symptom.

As briefly mentioned above, system 11 is not limited to information from the technician. It gathers information from databases, from the sensors and from the technician. Following are some examples of the types of information that the diagnostic system collects and typical sources of the information:

| Information | Source |
| --- | --- |
| Suspension type | Spec. Database |
| Steering System type | Spec. Database |
| Mileage | Customer Database or by asking technician |
| Vehicle Configuration | From Spec. database or from technician |
| How is the Vehicle being used | Ask technician/customer |
| Camber, Caster, Toe | From the sensors or from saved job information |
| What modifications have been made to the vehicle | Ask technician |
| Whether system has front wheel drive | Spec. Database |

Figure 10:
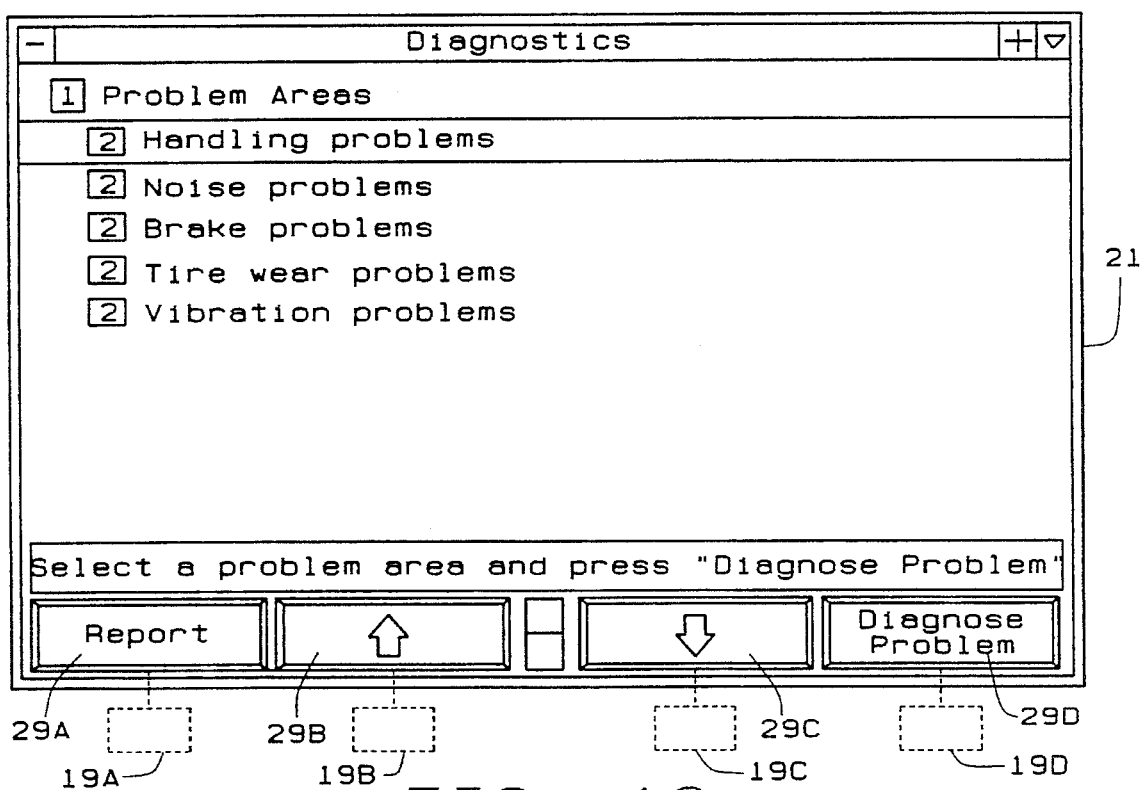
FIGS. 10–17 are examples of screens displayed by the system of FIG. 1 to the user on the console of FIG. 1.

The technician may enter the diagnostic mode from any of the "Primary" screens (not shown) in the vehicle alignment system. Upon entering the diagnostic mode, microcomputer 22 causes the screen shown in FIG. 10 to be displayed on display 21 to technician 17. As shown in FIG. 10, in the diagnostic mode, microcomputer 22 first presents the technician with a hierarchical list of problems. The "2" symbol on this screen indicates that there are items at a lower level in the hierarchy. The "1" symbol indicates that the items at the lower level are currently displayed.

At the bottom of the screen shown in FIG. 10, microcomputer 22 causes the display in blocks 29A–29D of the following: "Report", up-arrow, down-arrow, and "Diagnose Problem." By pressing the corresponding switch 19A–19D associated therewith, the technician may move through the screen and move to other screens. For example, by pressing switch 19C associated with block 29C (the down-arrow in this part of the program), the technician moves down the list of problem types shown in FIG. 10. Likewise, pressing switch 19B (associated with the up-arrow) moves the indicator up the list of problem types. Once the desired problem type on the screen of FIG. 10 is highlighted, the user presses switch 19D (associated with "Diagnose Problem"), which results in microcomputer 22 causing the display of the subsequent screen, in this case the screen illustrated in FIG. 11.

Figure 11:
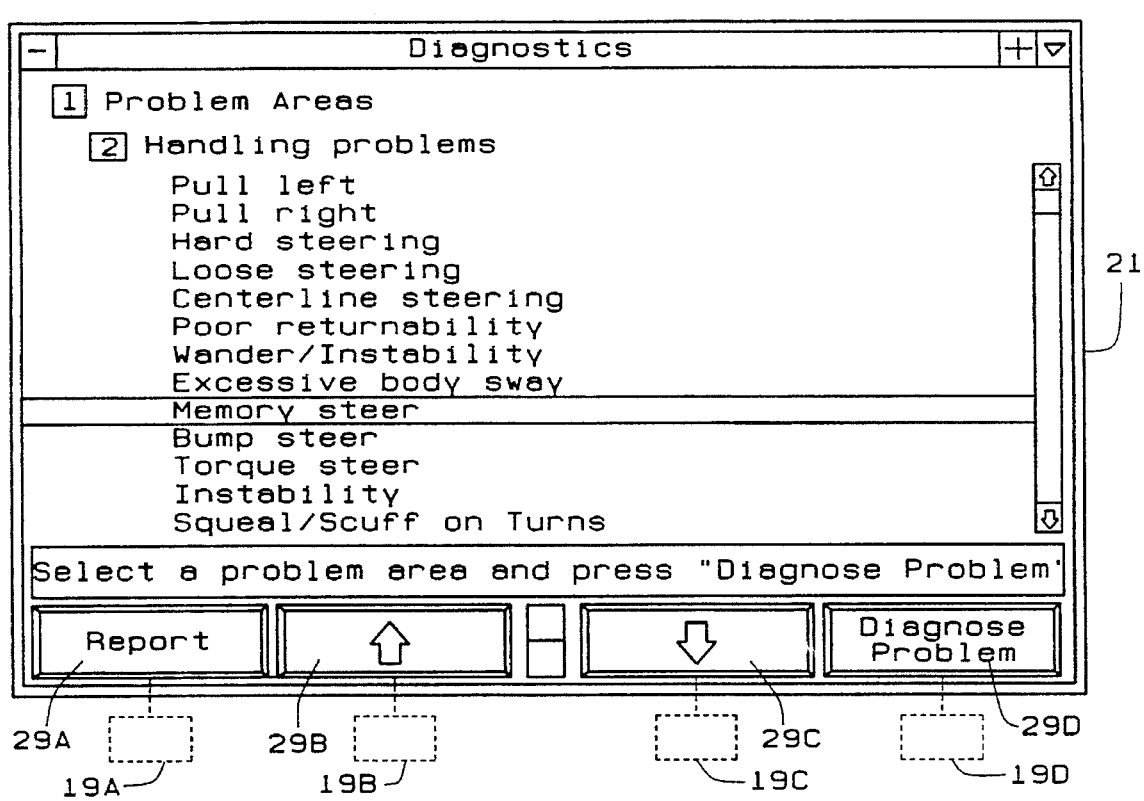

After the technician has selected a broad category of problems from the first list, he/she selects the precise problem or symptom from subsequent screens such as the one shown in FIG. 11. This is done by using switches 19B and 19C to highlight the precise symptom on screen 21, and then using switch 19D to proceed with the diagnostic procedure.

Figure 11A:
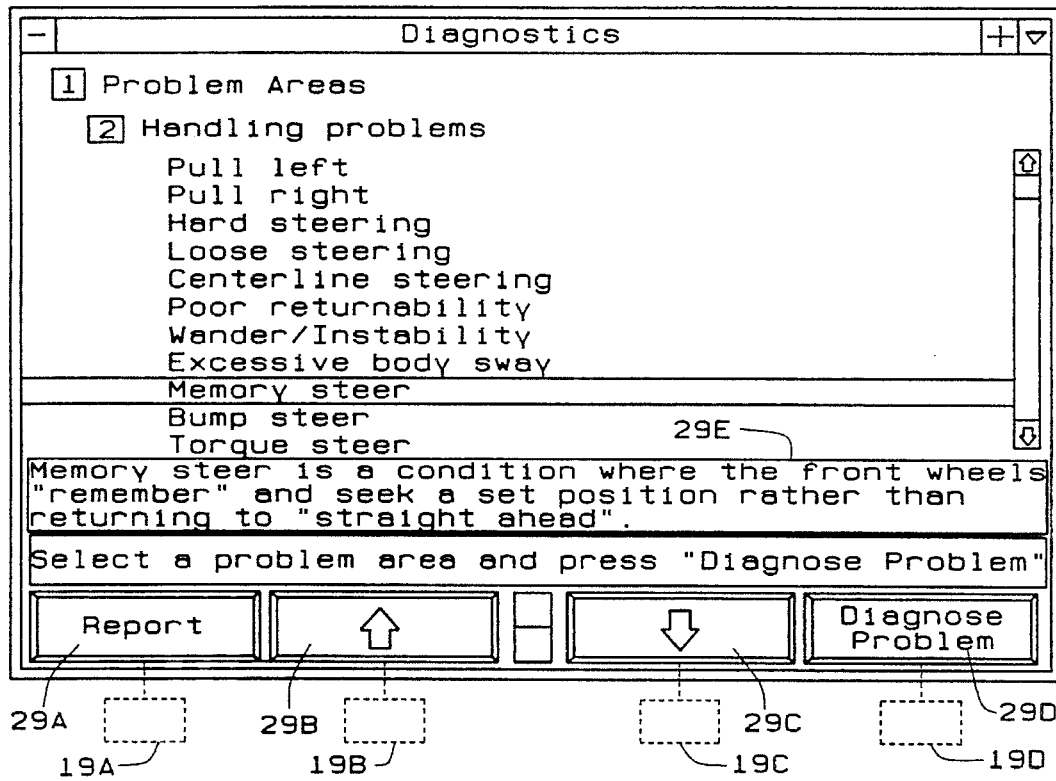

If desired, as shown in FIG. 11A, microcomputer 22 can aid the technician by displaying in a display block 29E the definition for each item as the technician moves through the list of items. For example, in FIG. 11A, the problem "memory steer" is highlighted and in display block 29E microcomputer 22 causes the display of the following definition: "Memory steer is a condition where the front wheels "remember" and seek a set position rather than returning to "straight ahead.""

It should be understood that the legends in the display blocks 29 are under complete control of microcomputer 22. In addition to those legends shown, various alternative legends can be displayed by the microcomputer to enter different modes and to perform other functions. Of the legends displayed, the "Report" legend is used to produce a report of the problem, the known facts and the possible causes, as discussed in detail below. The function of the up-arrow and down-arrow legends has already been discussed. The "Diagnose Problem" legend, as discussed above, is used to begin the diagnostics process by further qualifying the problem or by prompting the technician with a definition of the problem.

The user may instruct the microcomputer at any time (by a switch not shown) to display other legends. These legends for the particular screens shown in FIGS. 11 and 11A include a set of legends "Job Management", "Vehicle Specs", "Vehicle Measurements", and "Vehicle Inspection" for instructing the microcomputer to move to the primary screens for those functions. It should be understood that the diagnostic mode is fully integrated with these other functions. In particular, the technician/user is able to move to various modes of the aligner which may have some effect on the diagnostics. For example, in the Vehicle Specs mode, the technician may access the specification database. If the technician changes the specifications of a vehicle, the diagnosis may change. That is, measurements that once were within specifications, may now fall out of specifications. Or a technician may recall a vehicle with a different suspension type which may lead to a different diagnosis.

Similarly, in the Vehicle Measurements mode, the technician may observe measurements from sensors 25 attached to the vehicle. In this mode, he/she may make adjustments to the vehicle. Any changes that the technician makes in this mode is reflected subsequently in the diagnostic mode.

Likewise, in the Vehicle Inspection mode, the technician inspects a vehicle in order to produce a report of what parts of the vehicle are worn or damaged. If the fact that a part is worn is relevant to the problem that is being diagnosed, microcomputer 22 recognizes the fact that the technician identified the worn part in the Inspection mode, and will use that information subsequently in the diagnostic mode.

Additional legends such as "Clear All Answers" and "Help" are also displayable. Pressing "Clear all Answers" causes the microcomputer to clear all answers to all the questions that the technician has answered to that point in the procedure. The "Help" legend is self-explanatory.

Figure 12:
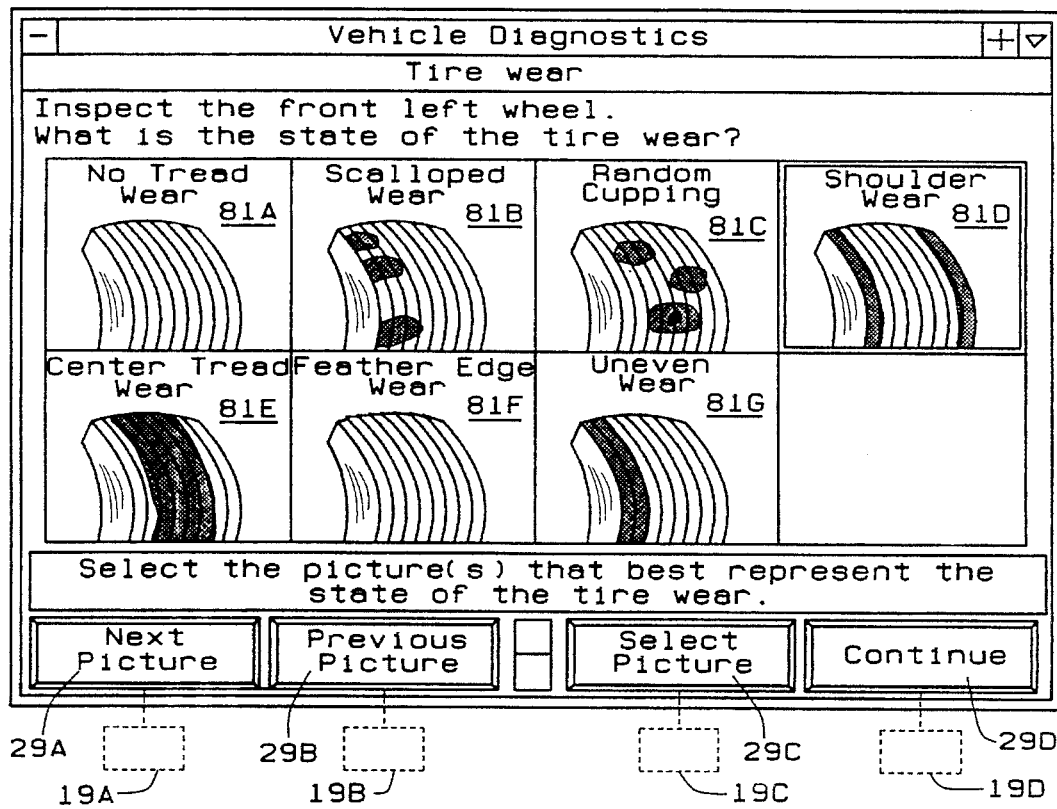

After the technician has identified a problem in the initial hierarchical list of problems, the system may need to qualify the problem further. For example, if the technician selects Tire Wear, microcomputer 22 may qualify the type of tire wear with a screen like that shown in FIG. 12.

In this type of screen various types of wear are illustrated in selectable panes 81A–81G. The technician uses switches 19A (associated with "Next Picture") and 19B (associated with "Previous Picture") to highlight the pane which best illustrates the state of wear, and then uses switch 19C (associated with "Select Picture") to select that particular pane. Although this feature is illustrated with respect to tire wear, it should be appreciated that it is applicable as well to other types of wear and symptoms.

Figure 13:
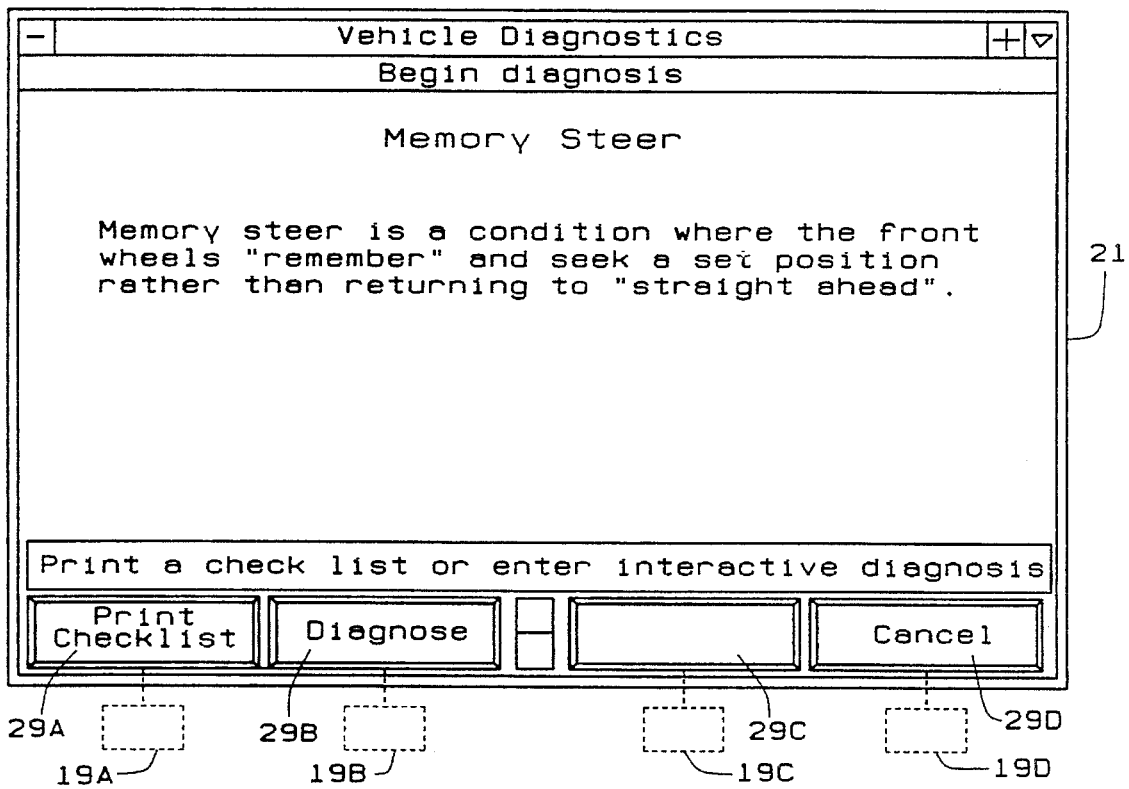

After the technician has selected a problem or symptom through the use of screens like those of FIGS. 11, 11A, and/or 12, microcomputer 22 causes the display on display 21 of a screen that defines the problem (see FIG. 13). This screen lets the technician decide if he/she wants a printed checklist or interactive diagnosis. If the technician selects "Print Checklist" by pressing switch 19A, microcomputer 22 will cause printer 24 to print out a printed report that can be used to diagnose the car without the computer. The report can also be used to talk to the customer without the aid of the computer, or to use in a road test of the vehicle.

Figure 14:
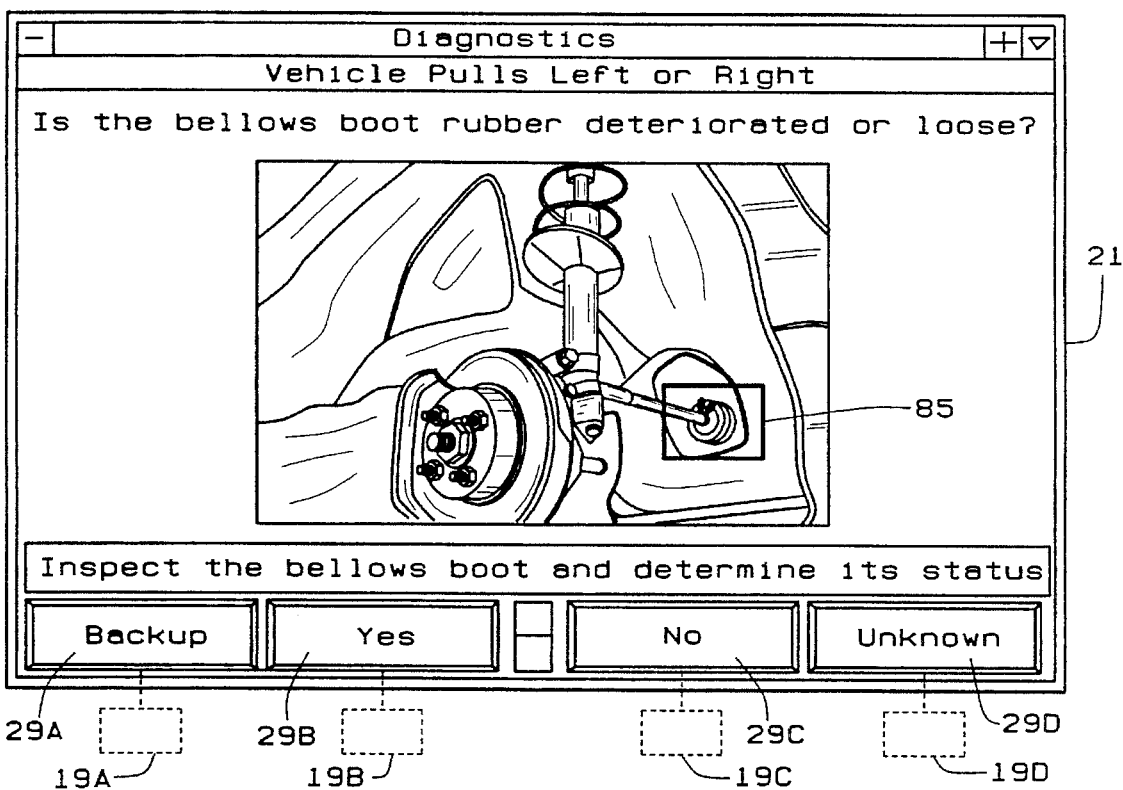

If the technician selects "Diagnose" (presses switch 19B), microcomputer 22 will cause the display of diagnostic questions and instruct the technician to perform diagnostic procedures. Whenever possible, microcomputer 22 will cause the display of diagnostic questions using pictures, such as illustrated in FIG. 14. These pictures are preferably actual photographs of the portion of the vehicle in question, although line art may also be used. As can be seen in FIG. 14, these diagnostic question screens with pictures include not only a picture and a diagnostic question, but also some indication (the box 85 in FIG. 14) highlighting the part to be inspected. The technician at this point has the option to back up one screen in the procedure (by pressing switch 19A), answering the question "yes" (by pressing switch 19B), answering the question "no" (by pressing switch 19C), or by answering the question as "unknown" (by pressing switch 19D).

Figure 15:
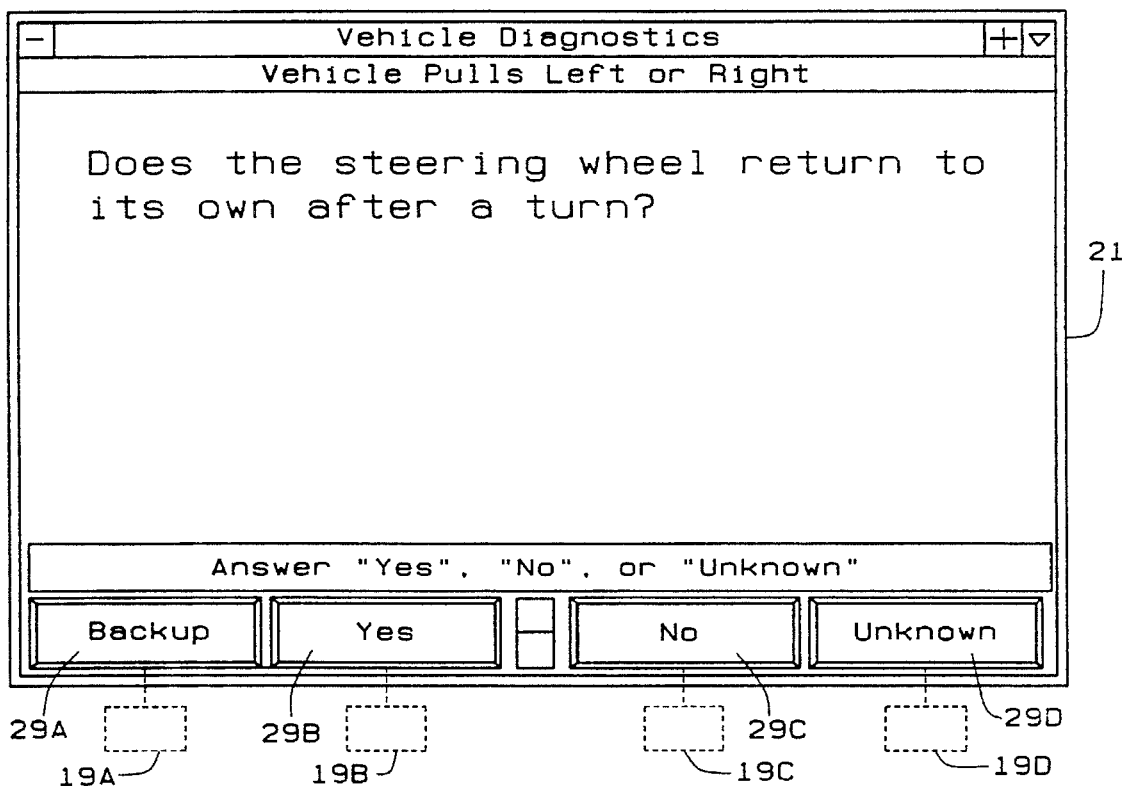

In many instances, microcomputer 22 causes the display of diagnostic questions without the aid of pictures, as shown in FIG. 15. In addition to the answer display blocks for the screens of FIGS. 14 and 15 discussed above, the microcomputer may at the technician's request also cause the display of the following legends "Report" (which results in the production of a report of the problem, the known facts and the possible causes), "Return To Problem List" (which results in returning to the main problem diagnostic screen), and "Restart Diagnosis" (which results in the clearing of all answers for the current diagnosis). If the technician chooses to return to the main screen, he/she may at that point diagnose another problem or reenter the diagnosis for the current problem.

Figure 16:
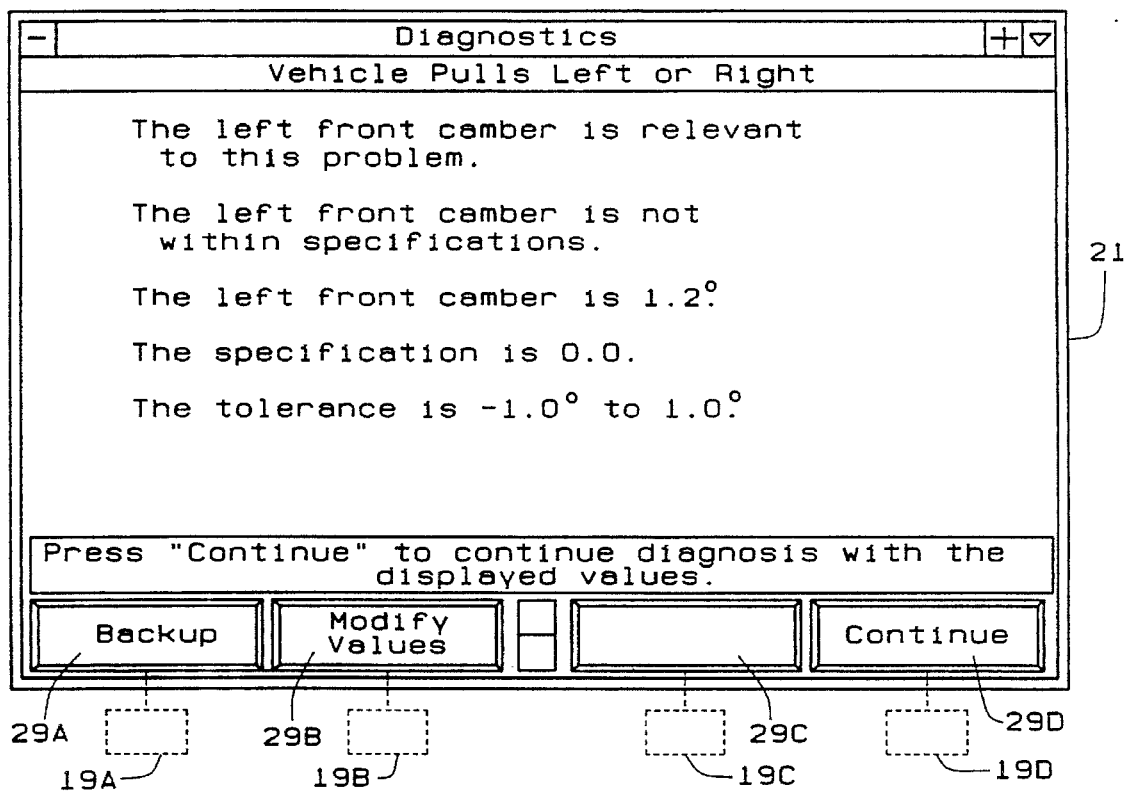

Microcomputer 22 will often need measurement information. It obtains this information from sensors 25 and 26 in the conventional way during the alignment mode. Microcomputer 22 also, when using measurement information, informs the technician of this fact by the display of a screen such as that shown in FIG. 16. For example, if the microcomputer requires left front camber information during a diagnosis, then display 21 informs the technician of the fact that left front camber information is being used, along with the results of the camber measurement.

The technician would usually press switch 19D to Continue with the diagnosis when he/she sees such a screen. However the technician could press switch 19B (associated with the legend "Modify Values") to change the camber value, the specification, or the tolerance. If the technician pressed "Modify Values," the screen would change to an edit screen, in which the technician uses a tab key (not shown) to move between the camber value, the specification, and the tolerance. The technician could change any of the values before pressing switch 19D to continue. The diagnostic system would use the altered values as it tries to determine the cause of the problem. If the technician alters the specification or the tolerance, the modified values will only be used within the diagnostic mode of system 11.

Figure 17:
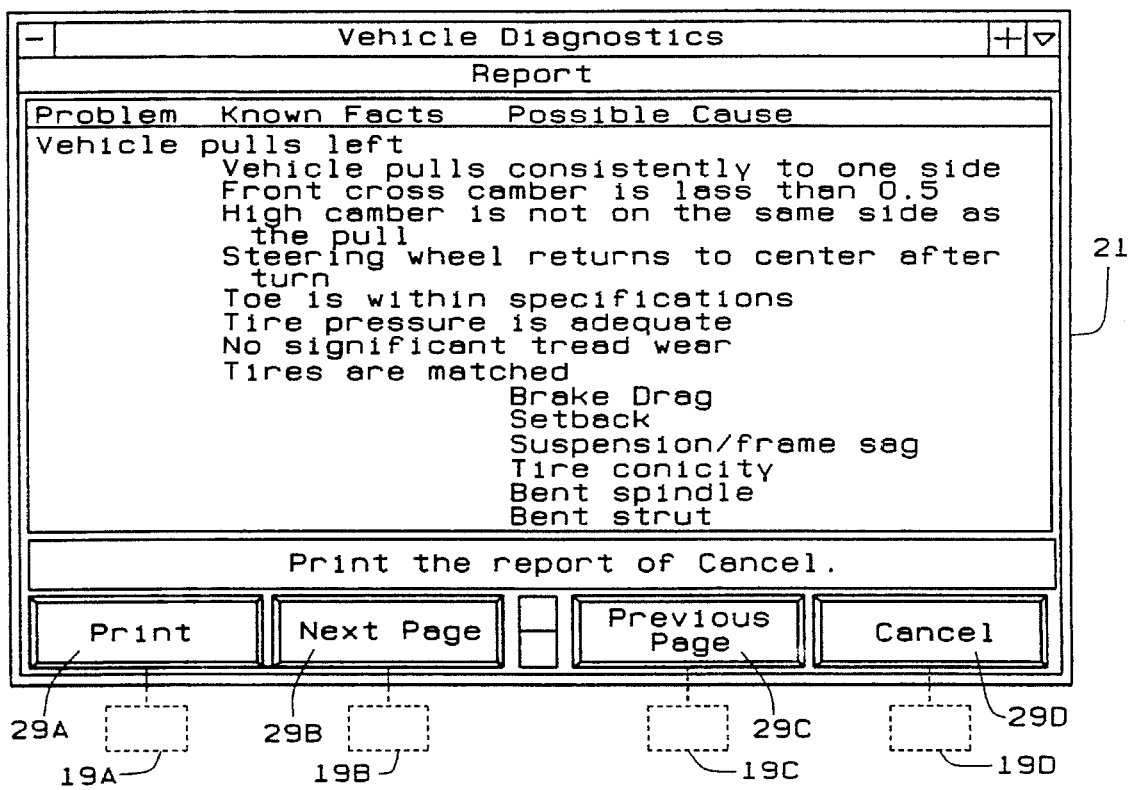

Once microcomputer 22 has reached a diagnosis, it displays a report to the technician, such as that shown in FIG. 17. The technician may also produce this report at any time by selecting "Report" from the soft keys on any diagnostic screen. The technician may view this report on screen 21 or print it on printer 24 (by pressing switch 19A). The report presents all the facts known by the system and all the possible cause of the problem in order of decreasing probability.

System 11 is able to diagnose a finite set of problems. For each of the problems there will be a finite number of causes that the diagnostic system understands. For example the diagnostic system is able to handle problems such as the following:

Pull Left/Right
Centerline Steering Error
Shimmy
Vibration
Hard Steering
Loose Steering
etc.

For the "Pull Left/Right" problem, the diagnostic system will understand a fixed number of causes, such as:

Uneven tire pressure
Uneven tread wear
Mismatched tires
Uneven Camber
Uneven caster
Brake drag
Setback
Suspension/frame sag
Tire conicity
Unbalanced power assist
Bent spindle
Bent strut
Worn suspension components (front/rear)
Rear suspension misalignment In performing the actual diagnosis, microcomputer 22 operates using a process of elimination. When the technician first identifies the problem, microcomputer 22 considers all of the potential causes for the problem as "Possible Causes." If the technician requests a report before he/she had answered any questions about a problem, then microcomputer 22 reports all of the potential causes of a problem as "Possible Causes". As the technician answers questions and performs diagnostic procedures, and as the diagnostic system gathers measurement information, the number of possible causes is reduced. Microcomputer 22 asks questions that will eliminate each possible cause in an effort to determine a single cause of the problem.

Note that the present system is not limited to use with sensors 25 and 26. For example, the technician could perform a diagnosis on a vehicle, by inspecting it "off of the rack" without measurement information. The technician could answer any of the questions that do not involve measurements. Microcomputer 22 is able to eliminate many of the possible causes and provide a useful list of the remaining possible causes for the technician.

With respect to diagnosing vehicle wheel alignment and suspension problems specifically taking into consideration ride height, jack 36 is used to vertically move the body 34 of the vehicle with respect to the wheels to temporarily change the ride height of the vehicle. Microcomputer 22 observes the readings from wheel alignment sensors 25 and the ride height sensor encoders 26, either continuously during the jacking process or at discrete times therein. For most applications, obtaining wheel alignment sensor and ride height measurements at the unjacked position and at the jacked position is sufficient.

A mechanical attachment method may be added to attach the finger 63 to the wheel arch of the vehicle 34. This would allow for hands free operation of one or more ride height measurements simultaneously during the jacking process.

Microcomputer 22 looks for changes in measured wheel alignment angles with changes in measured ride height to diagnose vehicle alignment and suspension problems. For example, changes in steering direction with changes in ride height indicate a bump steer condition. This fact is displayed to the technician/user as described above. Similarly, unequal changes in the angles measured by first and second sensors 25 (for example, sensors 25B and 25E) as ride height is changed reflect predetermined alignment and suspension problems, depending upon the type and magnitude of the differences.

In view of the above, it will be seen that the various objects and features of the present invention are achieved and other advantageous results obtained. The description of the present invention contained herein is intended to be illustrative and not to be taken in a limiting sense.

What is claimed is:

1. A vehicle wheel alignment apparatus comprising:

a storage device for storing vehicle wheel alignment angle specifications;

at least one wheel alignment sensor for acquiring wheel alignment angle data of at least one wheel mounted on a vehicle;

at least first and second ride height sensors for measuring the ride height of the vehicle whose alignment is to be measured at two different locations on the vehicle, said ride height sensors outputting signals indicative of the ride height measured at said two locations;

an electronic controller responsive to the acquired wheel alignment angle data and to the measured ride height signals for determining a composite ride height parameter and for adjusting measured wheel alignment angles as a function of the composite ride height parameter.

2. The vehicle wheel alignment apparatus as set forth in claim 1 wherein the wheel alignment angle specifications stored in the storage device are nominal specifications, said controller being responsive to the measured ride height for adjusting the nominal specifications to provide ride height adjusted specifications, said controller further comparing the measured wheel alignment angle with said ride height adjusted specifications to determine whether said measured wheel alignment angle falls within specifications.

3. A vehicle wheel alignment apparatus comprising:

a storage device for storing vehicle wheel alignment angle specifications;

at least one wheel alignment sensor for acquiring wheel alignment angle data for first and second wheels mounted on a vehicle;

at least first and second ride height sensors for measuring the ride height of the vehicle whose alignment is to be measured, said ride height sensors outputting signals indicative of the ride height of first and second wheels of the vehicle whose alignment is to be measured, said ride height sensors including means for automatically determining when to output said signal;

an electronic controller responsive to the acquired wheel alignment angle data and to the measured ride height for determining whether, taking into consideration the vehicle ride height, a measured wheel alignment angle falls within specifications;

wherein said first and second wheels are disposed on an axle, and wherein each wheel alignment sensor includes a toe sensor, the controller being responsive to the toe sensors to compute total toe for that axle of said vehicle, and being responsive to the ride height sensors for each said wheel of said axle to determine the ride height of said wheels and to calculate an average ride height for said wheels.

4. The vehicle wheel alignment apparatus as set forth in claim 3 wherein the controller is responsive to the ride height sensors for the two wheels to calculate an average ride height for said wheels.

5. The vehicle wheel alignment apparatus as set forth in claim 1 wherein said wheel alignment sensor includes at least one camber sensor with an associated ride height sensor, the controller being operatively connected to the camber sensor and associated ride height sensor to determine whether the measured camber from the camber sensor, taking into consideration the ride height measured by the associated ride height sensor, falls within the corresponding camber specification.

6. The vehicle wheel alignment apparatus as set forth in claim 1 wherein the storage device has stored therein separate specifications for different values of ride height, the controller being responsive to the measured ride height to access the specifications corresponding to that ride height value.

7. A vehicle wheel alignment apparatus comprising:

a storage device for storing vehicle wheel alignment angle specifications;

at least one wheel alignment sensor for acquiring wheel alignment angle data of at least one wheel mounted on a vehicle;

at least first and second ride height sensors for measuring the ride height of the vehicle whose alignment is to be measured, said at least one ride height outputting a signal indicative of the ride height of the wheel measured, said ride height sensor including means for automatically determining when to output said signal;

an electronic controller responsive to the acquired wheel alignment angle data and to the measured ride height for determining whether, taking into consideration the vehicle ride height, a measured wheel alignment angle falls within specifications;

at least a second ride height sensor, said controller being responsive to the ride height sensor measurements from the first and second ride height sensors to determine a front to back frame angle for the vehicle, further including at least a second wheel alignment sensor, said controller being responsive to the wheel alignment sensors to determine a caster angle and to adjust the caster angle as a function of the front to back frame angle.

8. A method of checking vehicle wheel alignment comprising the steps of:

electronically storing vehicle wheel alignment angle specifications;

electronically acquiring wheel alignment angle data of at least one wheel mounted on a vehicle;

automatically electronically measuring the ride height of the vehicle whose alignment is to be measured;

determining whether, as a function of the vehicle ride height, a measured wheel alignment angle falls within specifications;

electronically computing total toe for the wheels of at least one axle of said vehicle, and electronically determining the ride height of said wheels; and calculating an average ride height for said wheels.

9. A method of checking vehicle wheel alignment comprising the steps of:

electronically storing vehicle wheel alignment angle specifications:

electronically acquiring wheel alignment angle data of at least one wheel mounted on a vehicle;

automatically electronically measuring the ride height of the vehicle whose alignment is to be measured;

determining whether, as a function of the vehicle ride height, a measured wheel alignment angle falls within specifications;

wherein the step of electronically measuring the ride height includes making a first and a second ride height measurement at first and second vehicle wheels, said method further including determining from first and second ride height measurements a front to back frame angle for the vehicle, determining a caster angle, and adjusting the caster angle as a function of the front to back frame angle.

10. An apparatus which diagnoses vehicle wheel alignment and suspension problems, comprising:

wheel alignment sensor means for acquiring wheel alignment angle data for a plurality of wheels mounted on a vehicle;

ride height sensor means for measuring the ride height of the vehicle;

jacking means for vertically moving the body of the vehicle with respect to the wheels to temporarily change the ride height of the vehicle;

computer means operatively connected to the wheel alignment sensor means and the ride height sensor means and responsive to changes in measured wheel alignment angles with changes in measured ride height; said computer means including means for diagnosing vehicle alignment and suspension problems in response to said measured wheel alignment angles and measured ride height.

11. The apparatus for diagnosing vehicle wheel alignment and suspension problems as set forth in claim 10 wherein the wheel alignment sensor means includes toe sensors for sensing the toe of the two wheels of an axle of the vehicle, said computer means being responsive to changes in measured toe with changes in ride height to detect a bump steer condition.

12. The apparatus for diagnosing vehicle wheel alignment and suspension problems as set forth in claim 10 wherein the wheel alignment sensor means includes first and second sensor means associated with the left and right wheels respectively of an axle of the vehicle, said computer means being responsive to unequal changes in the angles measured by the first and second sensor means as ride height is changed to detect predetermined alignment and suspension problems.

13. The method of claim 10 wherein the computer means includes prompting means for obtaining further information of the vehicle being diagnosed, said diagnosing means being responsive to said obtained information to diagnose vehicle alignment and suspension problems.

14. A method of diagnosing vehicle wheel alignment and suspension problems, comprising the steps off (a) electronically acquiring wheel alignment angle data for a plurality of wheels mounted on a vehicle;

(b) electronically measuring the ride height of the vehicle;

(c) vertically moving the body of the vehicle with respect to the wheels to temporarily change the ride height of the vehicle;

(d) electronically acquiring wheel alignment angle data for the plurality of wheels while the ride height of the vehicle is changed;

(e) comparing the wheel alignment data acquired in steps (a) and (d); and diagnosing vehicle alignment and suspension problems by examining changes in measured wheel alignment angles with changes in measured ride height.

15. The method of diagnosing vehicle wheel alignment and suspension problems as set forth in claim 14 including sensing the toe of two steerable wheels of at least one axle of the vehicle, and examining changes in measured toe with changes in ride height to detect a bump steer condition.

16. The method of diagnosing vehicle wheel alignment and suspension problems as set forth in claim 14 including sensing wheel alignment angles for the left and right wheels of at least one axle of a vehicle, and, in response to unequal changes in the measured angles as ride height is changed, detecting predetermined alignment and suspension problems.

* * * * *